Aug. 27, 1940. C. A. TEA 2,212,759
SHOCK ABSORBER
Filed Oct. 25, 1937
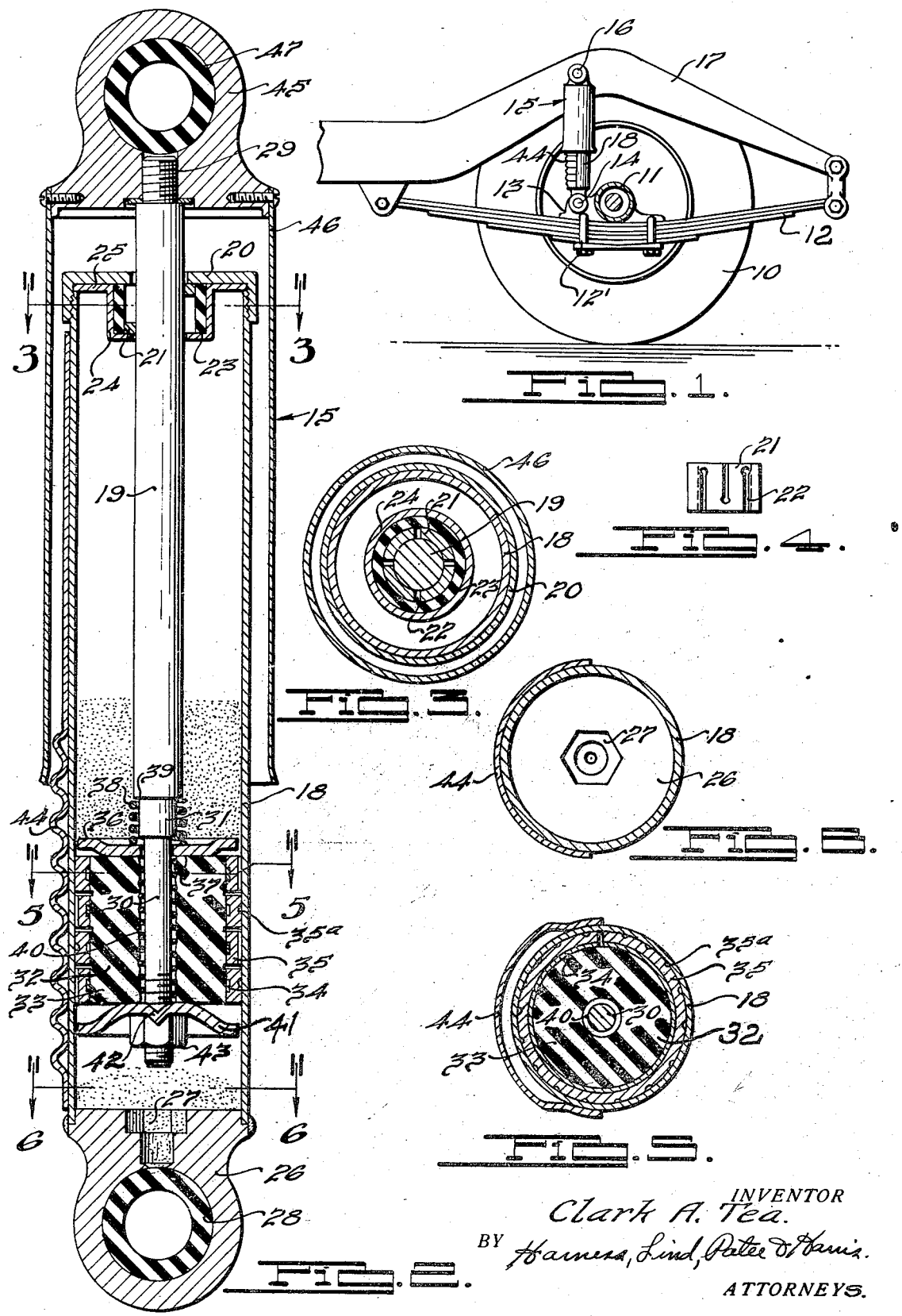
INVENTOR
Clark A. Tea.
BY Harness, Lind, Patee & Harris
ATTORNEYS.

Patented Aug. 27, 1940

2,212,759

UNITED STATES PATENT OFFICE 2,212,759

SHOCK ABSORBER

Clark A. Tea, Detroit, Mich., assignor to Chrysler Corporation, Highland Park, Mich., a corporation of Delaware Application October 25, 1937, Serial No. 170,745

11 Claims. (Cl. 267—9)

This invention relates to shock absorbers.

More particularly, the invention has reference to improvements in friction type shock absorbers of the character disclosed in Patent No. 2,088,450 issued jointly to Clark A. Tea and Roger K. Lee, which shock absorbers will produce a retarding effect proportional to the velocity of relative movement of movable members between which the shock absorber is operatively connected.

One of the main objects of the invention is to provide in a friction type shock absorber means for establishing a substantially definite coefficient of friction between the friction parts for substantially all conditions and temperatures of operation.

Another object of the invention is to provide a lubricant for establishing the coefficient of friction of the shock absorber which comprises a finely powdered material that is capable of being borne as a mist by the air currents set up within the shock absorber by the moving parts thereof so as to be uniformly and continuously distributed over the frictionally engaged surfaces of the device.

Other objects of the invention are to provide a retarding device of this kind which has a rubber piston and frictional lining comprising substantially ring-shaped elements which are spaced so as to accommodate a comparatively high degree of activity of the rubber and facilitate substantially uniform radial expansion of the piston in response to axial compression thereof; to provide a shock absorber of this character which has a piston comprising resilient material which is yieldable in all directions and which is adapted to accommodate substantial tolerances in assembly, and which has efficient sound absorbing properties; to provide a device of this kind which presents a predetermined frictional restraint to initial relative movement of the sprung and unsprung parts of a vehicle and which varies in its frictional restraining action in proportion to the variations of the velocity of relative movement of the sprung and unsprung portions; to provide a vehicle shock absorber of this character which increases the yielding opposition to approaching movement of the sprung and unsprung portions of a vehicle upon initial movement thereof and which thereafter decreases such opposition in proportion to the velocity of movement; and to provide means in a shock absorber of the aforesaid kind for maintaining the predetermined frictional restraint to initial movement of the sprung and unsprung portions of a vehicle in either direction.

A further object of the invention is to provide a retarding device of this character which includes a piston substantially sealed in a cylinder which is not only completely sealed against the admittance of water, dust, and other foreign matter, but also against the escapement of powdered lubricant. This means preferably includes a cylinder having a radially flexible dry bushing for reciprocably guiding the piston rod of the structure and which has a low coefficient of friction and comprises materials such as bronze, Silenite, plastic material, or some other similar material; backed by a soft cushioning ring of a suitable yieldable material such as rubber.

A still further object of the invention resides in the provision of means accessible from the exterior of the shock absorber for adjustably varying the predetermined frictional restraint to initial movement of the sprung and unsprung parts of a vehicle without requiring even partially disassembling of the shock absorber to do so.

Additional objects of the invention are to provide a piston and cylinder type frictional shock absorber of this character having passages between contacting surfaces thereof which are so constructed and arranged as to normally accommodate the passage of air and powdered lubricant from one side of the piston to the other side thereof during reciprocation of the piston; and to provide a simple and light shock absorber of this character having its operating parts compactly arranged for manufacture and assembly at relatively low cost, and improved operating characteristics under all conditions.

An illustrative embodiment of the invention is shown in the accompanying drawing, in which:

Fig. 1 is a partial side view of a motor vehicle rear wheel suspension unit showing the improved shock absorber installed between the sprung and unsprung portions of the vehicle.

Fig. 2 is a vertical, longitudinal sectional view of the shock absorber.

Fig. 3 is a transverse, sectional view taken on the line 3—3 of Fig. 2.

Fig. 4 is a detail elevational view of the piston rod bearing and sealing member shown in Fig. 2.

Fig. 5 is a transverse sectional view taken as indicated by the line 5—5 of Fig. 2.

Fig. 6 is a transverse sectional view taken along the line 6—6 of Fig. 2.

In the form of the invention illustrated, there is shown a partial side view of a motor vehicle rear wheel suspension unit having a road wheel 10 rotatably mounted on a driving axle 11. A leaf spring 12 is attached to the axle 11 by U-bolts 12'. Fixed to the spring 12 is a mounting plate 13 to which is pivotally attached at 14 one of the relatively movable parts of the improved shock absorber, generally designated by the numeral 15. The other relatively movable part of the shock absorber 15 is pivotally connected at 16 to the sprung portion 17 of the vehicle.

The improved shock absorber or retarding device includes a cylindrical casing 18 into which extends a piston rod 19 which is operatively connected with the vehicle sprung portion at 16. The upper end of the casing 18 has screw threaded thereon an end cap 20 having a central aperture through which the piston rod 19 extends. A radially flexible, preferably dry, annular bushing 21 of low coefficient of friction, such as bronze, Silenite, plastic material, or some other similar material, is provided for guiding the strokes of the piston rod. The bushing 21, best shown in Figs. 3 and 4, has slits 22 which render it sufficiently yieldable to accommodate radial contraction. A cushioning ring 23 of yieldable material, such as rubber, surrounds the bushing 21 and is retained in a casing 24 having an annular flange 25 adapted to be press-fitted in the cap 20 so as to house the bushing 21 and ring 23 between the cap 20 and casing 24. The casing 24 and ring 23 are so predetermined in dimension as to pre-compress the ring 23 against the bushing. The bushing 21 is thus yieldingly urged against the piston rod so as to effectively seal the outlet in the casing 24 through which the piston extends.

The opposite or lower end of the casing is closed by a shock absorber mounting end cap 26 fixed to the casing 18, preferably by welding, a wrench-like socket 27 being formed in the inner portion of the cap 26 to receive an adjustment member in a manner that will presently be set forth. A rubber bushing 28 is carried by the cap 26 for providing a quiet mounting of the shock absorber at its lower mounting 14. The shock absorber may be inverted with respect to the position shown on the drawing so as to pivotally connect the cylindrical casing 18 to the sprung portion of the vehicle without departing from the scope of the invention. While there is shown a shock absorber positioned at each of the rear wheels of the vehicle, it will be understood that two of such devices are provided at the front of the vehicle.

The rod 19 has a threaded end portion 29 which protrudes through the casing 18, the inner end of the rod having a reduced partially threaded portion 30 and a collar portion 31 which are disposed within the casing 18. The reduced portion 30 is adapted to be inserted through the central aperture of a piston, generally indicated by the numeral 32, comprising a cylindrical rubber element 33. Bonded or otherwise suitably secured to the outer periphery of the rubber element 33 are a plurality of split metallic bands 34 having a common axis. A friction lining element 35 having a split section corresponding to the split in each of the bands 34 is molded or otherwise suitably secured, as for example by snap-on attachment, to each of the bands respectively and each friction element 35 is adapted to be forced into engagement with the inner surface of the casing 18 as hereinafter described. The friction elements 35 are spaced apart axially of the piston and they have a helically extending groove portion 35ª in their outer peripheries.

A metallic dish-shaped washer 36 having a central aperture is carried on the reduced portion 30 of the rod 19 and has a base 37 conforming substantially with the flat upper surface of the rubber piston element 33 and is adapted to bear thereagainst when the parts of the shock absorber are in their illustrated condition. The washer 36 has a lesser diameter than the piston 32, the outer periphery terminating short of the outer periphery of the friction elements 35. A coil spring 38 surrounds the collar portion 31 of the rod 19 and has one end bearing against a shoulder 39 formed by the full diameter portion of the rod, the other end bearing against the upper face of the washer 36. A coil spring 40 is preferably disposed in the central opening of the rubber portion of the piston between the element 33 and the reduced portion 30 of the piston rod to prevent abrasion of the rubber by and adhesion thereof to the reduced portion of the piston rod.

Another dish-shaped washer 41 is positioned on the reduced portion 30 of the rod and bears against the lower flat face of the rubber element 33. The washer 41 has a crowned-shaped side adjacent the piston and V-shaped protuberances or ears 42 on its opposite side, the crowned side being adapted to bear against the element 33 when the parts of the shock absorber are in their assembled condition. The diameter of the washer 41 corresponds with that of the washer 36 and the rubber portion 33 of the piston 32 and washers 36 and 41 thereof are retained on the rod 19 by a notcher self-locking nut 43 threaded on the threaded portion 30 of the rod.

If desired, a corrugated member 44 may be suitably fixed to the outer surface of the casing 18 to deflect stones that are thrown up by the vehicle wheels and otherwise protect the cylinder 18 from injury.

The end portion 29 of the rod 19 is threaded to a shock absorber mounting end member 45 which has fixed thereto a tubular wall member 46 which telescopes the casing 18 and member 44 providing a weather, dust and protective shield around the cylinder 18. A rubber washer 47 is carried by the member 45 to provide a silent upper mounting of the shock absorber at 16. The member 45 is so spaced from the upper surface of the cap 20 that when they are brought into contact, the inner reduced end 30 of the rod 19 and the nut 43 will be in operative relationship with the wrench-like socket 27 to permit adjustment of the nut by relative rotative movement of the piston and cylinder portions of the shock absorber without disassembling any member thereof or removing any fluid or lubricant.

When the piston 32 is in its illustrated position with the sprung and unsprung portions in their normal position, the spring 38 is preferably compressed sufficiently to exert an axially directed pressure on the base 37 of the washer 36 which causes the rubber element 33 to be expanded radially outwardly—thereby forcing the friction members 35 into frictional engagement with the inner surface of the casing 18. This initial frictional engagement may be predetermined to a given value by varying the compression of the spring 38 through adjustment of the self-locking nut 43 of the rod 19.

In the operation of the device illustrated in Fig. 1, the shock absorber parts are shown in the position assumed when the sprung and unsprung portions of the vehicle are in this normal position, at which time the piston exerts a predetermined frictional restraint through engagement with the casing to initial movement of the vehicle portions. The rubber element 33 is subjected to a stress in shear and compression. As the piston is moved downwardly in response to approaching movement of the vehicle parts the rubber element 33 tends to elongate when spring 38 is compressed. If this downward movement be gradual and of a relatively slight force, the initial frictional restraint will continue or only slightly increase, such movement being insufficient to compress the spring 38. However, if the approaching movement be sudden and of an increased velocity, the rubber 33 will elongate sufficiently instantaneously to overcome the initial restraint.

When the sprung and unsprung portions of the vehicle have reached the extent of their approaching movement there follows a separatory movement of such portions, due to the recoil action of the springs 12. This movement causes the piston to be moved upwardly within the casing, the rubber 33 being stressed in shear and compression. As the piston returns to its normal contour following any elongation during the approaching movement, the initial restraint is again obtained. However, as the velocity of the separatory movement increases this initial restraint is augmented by further compression of the rubber, in response to an upwardly pull, the tendency of which is to compress the piston axially and expand it outwardly.

The space between the friction elements 35 accommodates deflection of the cylindrical rubber element 33 to facilitate distribution of the radial thrust derived from said axial compression upon a plurality of these frictional elements 35.

To lubricate the friction parts of the shock absorber and to establish a substantially uniform coefficient of friction between the elements 35 and the inner surface of the casing 18 preferably a powdered lubricant having a substantially uniform coefficient of friction under all normal operating conditions and temperatures is placed inside the casing. Desirable results have been obtained by using a 200 mesh insoluble soap, such as calcium stearate, zinc stearate, or magnesium stearate.

The lubricant in the casing 18 is so fine that it is blown into the air and is borne by the air as a dense mist or gas as long as the piston 32 is operating and disturbing the air in the casing. These suspended particles of powder are continuously blown or pushed over the friction elements 35 by means of the grooves 35ª, which act as lubricant wells at axially spaced locations on the periphery of the piston. The lubricant thus completely covers all internal surfaces of the casing 18, rod 19, and piston 32 and serves as a corrosion inhibitor.

This use of powdered lubricant not only establishes a uniformly acting shock absorber for all normal operating conditions and temperatures, but also effects a lighter and more efficient shock absorber that does not require periodical inspection and replenishment of the lubricant supply.

The bushing 21, yieldingly urged by the member 23 against the piston rod 19, prevents water and dirt from entering the casing 18 but also prevents the escape of air and the lubricant while accommodating relative movement between the piston rod and the casing.

The adjustment of the initial frictional engagement of the elements 35 with the casing 18 is effected by bringing the member 45 into contact with the end cap 20 so that the slotted adjusting nut is in operative engagement with the socket 27 of the end cap 26. Then the cap 26 is adjustably rotated to the desired position, the spring 38 being compressed or expanded accordingly to vary the radial force exerted by the rubber element 33 on the elements 35. This adjustment is conveniently and quickly made from the outside of the shock absorber without disassembling any member thereof, or exposing the lubricant to possible escape or foreign matter.

Various modifications and changes may be effected in the illustrated application without departing from the spirit of the invention or from the scope of the appended claims.

What I claim is:

1. A shock absorber for controlling relative movements of the sprung and unsprung portions of a vehicle including frictionally engaged parts each secured to one of said vehicle portions respectively, one of said shock absorber parts including a compressible resilient element adapted to accommodate variation of the force of friction of the engagement of said parts, and means for operating upon said element to vary said force of friction including releasable engageable devices on said shock absorber parts respectively adapted when engaged to vary said force of friction by relative rotation of said parts, said device of the shock absorber part which includes said resilient element comprising a pair of relatively rotatable members having interlocking portions yieldably urged together by said resilient element for releasably holding said latter device in an adjusted position.

2. A shock absorber for controlling relative movements of the sprung and unsprung portions of a vehicle including a cylinder securable to one of said vehicle portions, a piston in said cylinder securable to the other vehicle portions, said piston comprising an integral yieldable body portion having a plurality of axially spaced friction bands on its periphery, the outer surfaces of said friction bands being concentric with and in frictional engagement with said cylinder and the inner surfaces of said bands being concentric with the exterior of said piston and the major portions of said inner surfaces being in firm contact therewith, and means for variably compressing said body portion axially to vary the radial thrust thereof on said friction bands, the spaces between said bands accommodating deflection of said yieldable body portion to facilitate distribution of the radial thrust derived from said axial compression upon a plurality of said friction bands, said yieldable body portion exerting a substantially uniform radial thrust on all portions of each of the bands acted on in response to said axial compression.

3. A shock absorber for controlling relative movements of the sprung and unsprung portions of a vehicle including a cylinder securable to one of said vehicle portions, said piston comprising an integral yieldable body portion having a plurality of axially spaced friction bands on its periphery, each of said bands having a cylindrical outer surface in frictional engagement with said cylinder and having the major portion of its internal surface in contact with said piston, and means normally holding said body portion under a predetermined axial compression for urging said friction bands against said cylinder with a predetermined force of friction, the spaces between said bands accommodating deflection of said yieldable body portion to facilitate distribution of the radial thrust derived from said axial compression upon a plurality of said friction bands, said yieldable body portion being so constructed and arranged as to exert substantially uniform thrust on all portions of each band acted on in response to said axial compression.

4. A shock absorber for controlling movements of relatively movable parts of a structure including a substantially sealed casing securable to one of said parts, a member movable in said casing frictionally engaged with surfaces thereof and having an externally projecting part extending therefrom securable to the other part of said structure, and a mobile free mass of substantially dry lubricant in said casing adapted to establish a substantially constant coefficient of friction between said casing and said member.

5. A shock absorber for controlling movements of relatively movable parts of a structure including a substantially sealed casing securable to one of said parts, a member movable in said casing frictionally engaged with surfaces thereof and having an externally projecting part extending therefrom securable to the other part of said structure, and a mobile free mass of finely divided powdered lubricant in said casing comprising free particles adapted to be distributed as a mist by the air currents in said casing resulting from relative movement of said casing and said member for providing a substantially constant coefficient of friction therebetween.

6. A shock absorber for controlling movements of relatively movable parts of a structure including a substantially sealed casing securable to one of said parts, a member movable in said casing frictionally engaged with surfaces thereof and having an externally projecting part extending therefrom securable to the other part of said structure, there being a passage between the frictionally engaged surfaces of said casing and member extending in the general direction of the axis of said piston for accommodating the passage of air from one side of said member to the other during operation of said shock absorber, and a mobile free mass of finely divided powdered lubricant in said casing comprising free particles adapted to be distributed as a mist and carried from one side to the other of said member by the air currents in said casing resulting from relative movement of the latter and said member.

7. In a retarding device adapted to control movement between two relatively movable parts comprising slidably related frictionally engaged piston and cylinder members, a piston rod extending through a restricted end of said cylinder member, a radially flexible bushing of low coefficient of friction embracing said rod and located at the restricted end of said cylinder, a yieldable backing member surrounding said bushing, and a casing for housing said bushing and said yieldable member and for precompressing said cushioning member against said bushing and said bushing against said rod for sealing said casing at the location from which said rod extends.

8. In combination with a retarding device having two slidably related frictionally engaged members, of a mobile mass of unconfined powdered lubricant having a substantially constant predetermined coefficient of friction under substantially all conditions and temperatures to which said device is subjected, said device being so constructed and arranged as to effectively distribute and receive on its friction surfaces said lubricant during movements of said members.

9. In a retarding device adapted to control movement between two relatively movable parts comprising a casing, a piston including a body portion comprising yieldable material and having a plurality of frictional elements in engagement with the inner surface of said casing, a charge of powdered lubricating material in said casing comprising a mobile mass of unconfined particles, and means for permanently sealing said casing while accommodating relative movement between said casing and said piston.

10. In a retarding device adapted to control movement between two relatively movable parts comprising a casing, a piston rod having a threaded end portion, a piston on said rod comprising a rubber body portion and a plurality of frictional elements mounted thereon and in engagement with the inner surface of said casing and adapted to exert a predetermined restraint upon initial movement of said parts from a normal position, an abutment mounted on said rod and engageable with an end face of said rubber body portion for expanding the latter radially to increase the force of friction applied thereby on said casing in proportion to variations in the velocity of relative movement of said piston and said casing, a nut in threaded engagement with said threaded rod end portion for adjustably urging said abutment against said rubber body portion, said nut and said abutment having interlocking portions yieldably urged together by said rubber body portion for releasably holding said nut and abutment against unintended relative rotative movement an end cap secured to one end of said casing for sealing the latter, said cap having a wrench socket portion arranged to receive said nut, and an end cap fixed to the other end of said casing for sealing the latter and having an opening for accommodating said rod, said nut being adjustable by relative rotation of said rod and said socket when said nut is engaged in said socket.

11. In a retarding device adapted to control movement between two relatively movable parts comprising slidably related frictionally engaged members, air-borne powdered lubricant carried within said members having a substantially constant coefficient of friction under all conditions and temperatures, means for admitting said air-borne particles of lubricant to all frictional surfaces of said device and sealing said casing against the escape of air and said lubricant while permitting relative movement between said members.

CLARK A. TEA.